United States Patent
Kuan

(10) Patent No.: US 9,577,452 B2
(45) Date of Patent: Feb. 21, 2017

(54) PORTABLE ELECTRONIC DEVICE AND CHARGING METHOD THEREFOR

(71) Applicant: HTC Corporation, Taoyuan, Taoyuan County (TW)

(72) Inventor: Tsung-Pao Kuan, Taoyuan (TW)

(73) Assignee: HTC Corporation, Taoyuan (TW)

( * ) Notice: Subject to any disclaimer, the term of this patent is extended or adjusted under 35 U.S.C. 154(b) by 272 days.

(21) Appl. No.: 14/561,792

(22) Filed: Dec. 5, 2014

(65) Prior Publication Data

US 2016/0164321 A1 Jun. 9, 2016

(51) Int. Cl.
*H02J 7/00* (2006.01)

(52) U.S. Cl.
CPC .......... *H02J 7/0044* (2013.01); *H02J 7/0004* (2013.01); *H02J 7/0052* (2013.01); *H02J 7/0011* (2013.01); *H02J 2007/0001* (2013.01); *H02J 2007/0062* (2013.01); *H02J 2007/0095* (2013.01); *H02J 2007/0096* (2013.01); *H02J 2007/0098* (2013.01)

(58) Field of Classification Search
CPC .................. H02J 7/0004; H02J 7/0011; H02J 2007/0062; H02J 2007/0095; H02J 2007/0096; H02J 2007/0098

USPC .......................................... 320/107, 111, 114
See application file for complete search history.

(56) References Cited

U.S. PATENT DOCUMENTS

| | | | |
|---|---|---|---|
| 8,683,090 B2* | 3/2014 | Mullins | G06F 21/44 320/114 |
| 9,146,888 B2* | 9/2015 | Terlizzi | G06F 13/38 |
| 2013/0305066 A1* | 11/2013 | Mullins | G06F 1/266 713/310 |
| 2014/0070774 A1* | 3/2014 | Terlizzi | H02J 7/0004 320/162 |

\* cited by examiner

*Primary Examiner* — Stacy Whitmore
(74) *Attorney, Agent, or Firm* — Birch, Stewart, Kolasch & Birch, LLP

(57) ABSTRACT

A portable electronic device includes a connector including first and second data pins and a power pin; a battery charging circuit configured to receive a charging current and a power voltage from an external device via the power pin and charge a battery according to the charging current; and a processor configured to make the first and second data pins, which are shorted by the external device, open and obtain an identification code via the first and second data pins from the external device after the first and second data pins are opened, wherein if the identification code matches a specific code, the processor sends a requirement to the external device, and the power voltage and the charging current received by the battery charging circuit are increased by the external device in response to the requirement.

20 Claims, 3 Drawing Sheets

US 9,577,452 B2

PORTABLE ELECTRONIC DEVICE AND CHARGING METHOD THEREFOR

BACKGROUND OF THE INVENTION

Field of the Invention

The invention relates to a portable electronic device, and more particularly to a charging method for a portable electronic device.

Description of the Related Art

In general, a portable electronic device, such as a smart phone, a tablet computer and so on, comprises a battery and a battery charging circuit, wherein various types of adapters may be employed to charge the battery of the portable electronic device via the battery charging circuit. For example, a conventional adapter supporting the Universal Serial Bus (USB) standard may generate and provide an output power around 5V/0.5 A or 5V/5 A to charge a portable electronic device via a connector supporting the USB standard. A conventional battery charging circuit of a portable electronic device limits the charging current provided by an adapter to a fixed level, regardless of the type of the adapter and the magnitude of the charging current that the adapter provides.

Therefore, it is necessary to recognize the types of adapters and to enable related charging schemes according to the charging currents of adapters.

BRIEF SUMMARY OF THE INVENTION

A portable electronic device and a charging method thereof are provided. An embodiment of a portable electronic device is provided. The portable electronic device comprises a memory, a battery, a connector and a processor. The connector includes first and second data pins and a power pin. The battery charging circuit is configured to receive a charging current and a power voltage from an external device via the power pin and charge the battery according to the charging current. The processor is configured to make the first and second data pins, which are shorted by the external device, open and obtain an identification code via the first and second data pins from the external device after the first and second data pins are opened, wherein if the identification code matches a specific code stored in the memory, the processor sends a requirement to the external device. The power voltage and the charging current received by the battery charging circuit are increased by the external device in response to the requirement.

Furthermore, an embodiment of a charging method for a portable electronic device is provided. The portable electronic device comprises a battery, a memory and a connector having a first pin, a second pin and a power pin. Firstly, a charging current and a power voltage are received from an external device via the power pin, to charge the battery according to the charging current. Then, it is detected whether the first data pin and the second data pin are shorted by the external device when the power voltage is higher than a specific voltage. Next, a request is sent to the external device for making the first and second data pins open, and an identification code is obtained from the external device via the first and second data pins after the first and second data pins are opened in response to the request. Afterwards, a requirement is sent to the external device if the identification code matches a specific code stored in the memory, wherein the power voltage and the charging current are increased by the external device in response to the requirement. Finally, the battery is charged according to the increased charging current.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
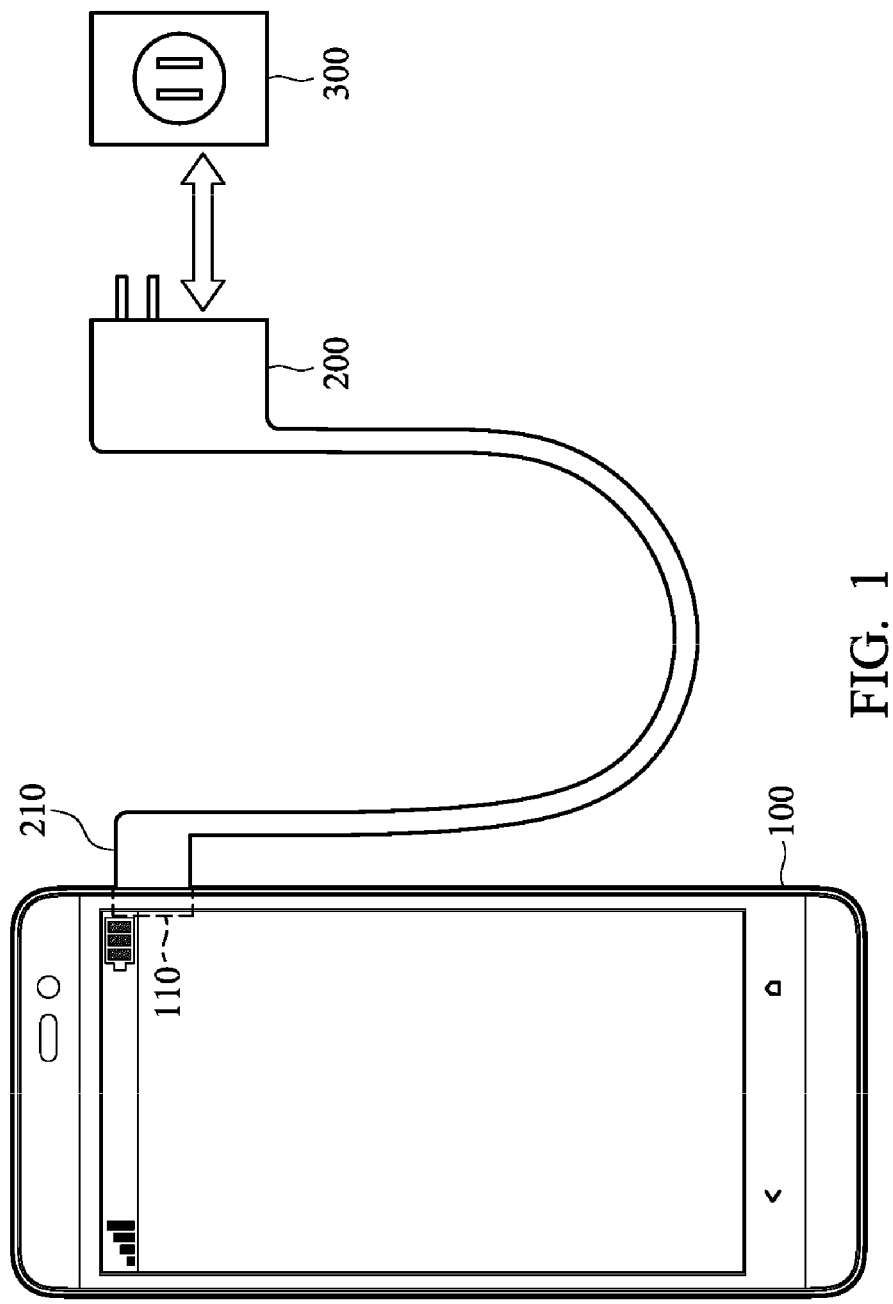
FIG. 1 shows a portable electronic device according to an embodiment of the invention.

FIG. 1 shows a portable electronic device 100 according to an embodiment of the invention. In FIG. 1, the portable electronic device 100 may be charged by an external device 200. The external device 200 may be a power adapter and has a connector 210 to be connected to a connector 110 of the portable electronic device 100 for charging the portable electronic device 100 when it receives power from a power source, e.g. an electrical outlet 300. When the external device 200 is electrically connected to the electrical outlet 300 and its connector 210 is electrically connected to the connector 110 of the portable electronic device 100, the portable electronic device 100 will recognize the external device 200 to obtain the charging capability thereof, and then enable related charging schemes. In one embodiment, the power source may be a computer or a notebook, which could provide power to charge the electronic device 100 via a cable, e.g. an USB cable.

Figure 2:
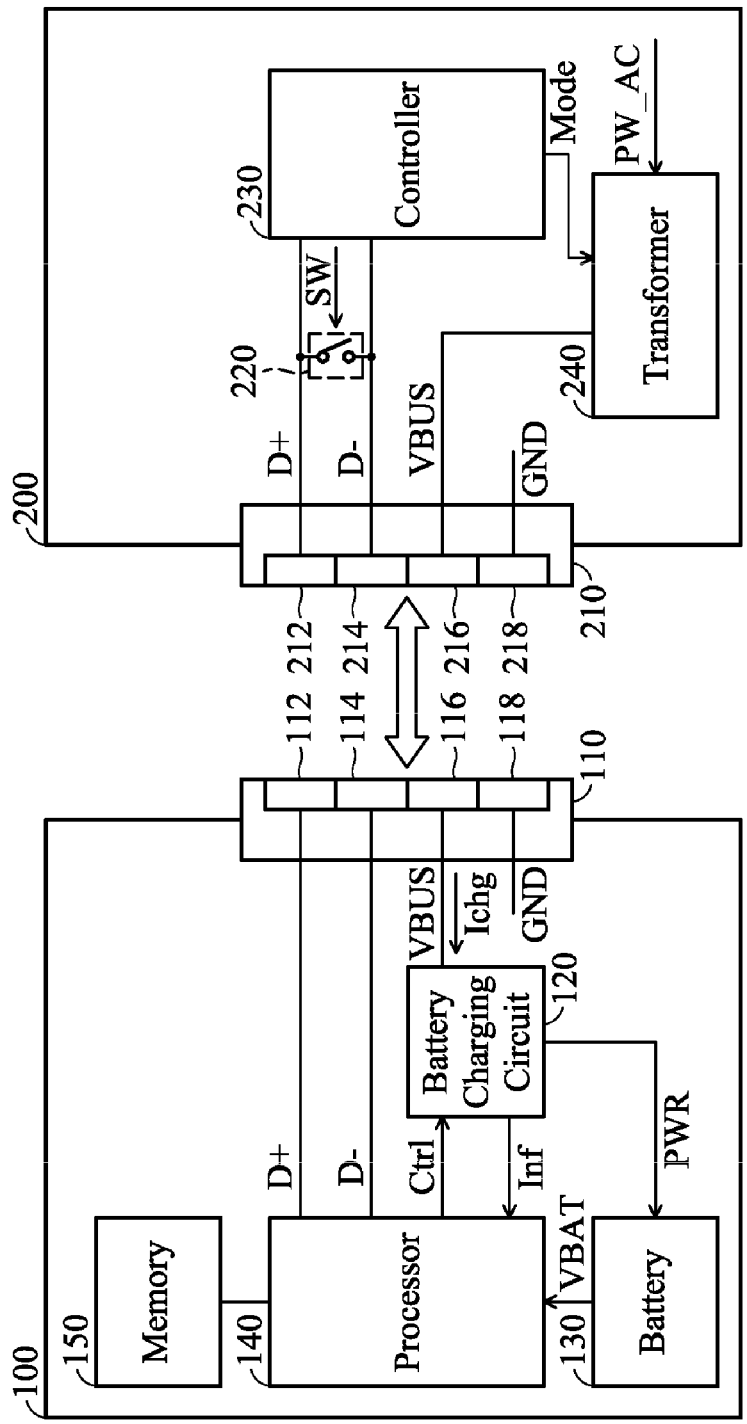
FIG. 2 shows an example schematic illustrating the portable electronic device and the adapter of FIG. 1 according to an embodiment of the invention.

FIG. 2 shows an example schematic illustrating the portable electronic device 100 and the adapter 200 of FIG. 1 according to an embodiment of the invention. The adapter 200 comprises the connector 210, a switch 220, a controller 230 and a transformer 240. In this embodiment, the connector 210 may be an USB connector and comprises two data pins 212 and 214 and two power pins 216 and 218. In the connector 210, the data pins 212 and 214 are compatible with a USB_D+ pin and a USB_D− pin of the USB standard, the power pin 216 is compatible with a VBUS pin of the USB standard, and the power pin 218 is compatible with a GND pin of the USB standard. The switch 220 is coupled between the data pins 212 and 214, and the switch 220 is controlled by a control signal SW from the controller 230. The transformer 240 is used to convert an AC power PW_AC into a power voltage VBUS according to a control signal Mode from the controller 230. In a normal charging mode, the controller 230 provides the control signal Mode to the transformer 240, to control the power voltage VBUS to 5V. In a fast charging mode, the controller 230 provides the control signal Mode to the transformer 240, to control the power voltage VBUS to a voltage higher than 5V, e.g. 9V or 12V.

In FIG. 2, the portable electronic device 100 comprises the connector 110, a battery charging circuit 120, a battery 130, a processor 140 and a memory 150. The connector 110 comprises two data pins 112 and 114 and two power pins 116 and 118 corresponding to the two data pins 212 and 214 and the two power pins 216 and 218 of the connector 210. In the connector 110, the data pins 112 and 114 are compatible with a USB_D+ pin and a USB_D− pin of USB standard, the power pin 116 is compatible with a VBUS pin of USB standard, and the power pin 118 is compatible with a GND pin of USB standard. When the adapter 200 is connected to the portable electronic device 100 via the connection of the connector 210 and the connector 110, the two data pins 212 and 214 and the two power pins 216 and 218 of the connector 210 are electrically connected to the two data pins 112 and 114 and two power pins 116 and 118 of the connector 110. The battery charging circuit 120 is electrically coupled between the connector 110 and the battery 130, and configured to receive a power voltage VBUS and a charging current Ichg from the adapter 200 via the power pin 116 of the connector 110 and to provide a power signal PWR to charge the battery 130 according to the charging current Ichg. Furthermore, when the power voltage VBUS is higher than a predetermined voltage, e.g. 4.7 volt, the battery charging circuit 120 further provides a signal Inf to notify the processor 140 that the power signal VBUS from the adapter 200 has been input. The battery 130 is charged by the power signal PWR and is capable of providing a voltage VBAT to power the processor 140. When the processor 140 receives the signal Inf from the battery charging circuit 120, the processor 140 detects whether the data pins 112 and 114 of the connector 110 are shorted by the adapter 200. If it is detected that the data pins 112 and 114 of the connector 110 are shorted by the adapter 200, the processor 140 sends a request via the data pins 112 and 114 to the adapter 200, in order to open the short between the data pins 112 and 114. In one embodiment, the processor 140 may send the request to the adapter 200 by toggling the data pins 112 and 114. For example, the processor 140 may force the data pins 112 and 114 to a high logic level for a first time period. Next, the processor 140 may force the data pins 112 and 114 to a low logic level for a second time period. Finally, the processor 140 may force the data pins 112 and 114 to the high logic level again for a third time period. When the controller 230 of the adapter 200 detects that the data pins 212 and 214 of the connector 210 are toggled, the controller 230 provides the control signal SW to turn off the switch 220 such that the short between the pins 112 and 114 becomes open by opening the short between the pins 212 and 214. After the switch 220 is turned off by the controller 230 (i.e. the short between the data pins 112 and 114 of connector 110 becomes opened), the processor 140 performs an authentication operation with the controller 230 of the adapter 200 via the data pins 112 and 114 of the connector 110. For example, an algorithm, e.g. AES 128, is used to perform the authentication operation, and a plurality of authentication challenges and authentication responses are transferred between the processor 140 of the portable electronic device 100 and the controller 230 of the adapter 200. If the authentication operation is unsuccessful, the processor 140 determines that a maximum charging current that the adapter 200 can provide is larger than 500 mA, e.g. 1 A, and then the processor 140 provides a control signal Ctrl to notify the battery charging circuit 120. Thus, the battery charging circuit 120 will receive the charging current Ichg of 1 A via the power pin 116 from the adapter 200. Conversely, if the authentication operation is successful, the processor 140 obtains an identification code from the controller 230 of the adapter 200. Next, the processor 140 identifies the identification code according to a plurality of specific codes stored in the memory 150, wherein the specific codes represent the various types of adapters that can provide a high power voltage for charging. If the identification code does not match any of the specific codes, the processor 140 determines that the maximum charging current that the adapter 200 can provide is larger than 1 A, e.g. 1.5 A, and then the processor 140 provides the control signal Ctrl to notify the battery charging circuit 120. Thus, the battery charging circuit 120 will receive the charging current Ichg of 1.5 A. Conversely, if the identification code matches one of the specific codes, the processor 140 determines that the maximum charging current that the adapter 200 can provide is larger than 1.5 A, and then the processor 140 provides a requirement to the adapter 200 via the data pins 112 and 114 of the connector 110. In response to the requirement received by the data pins 212 and 214 of the connector 210, the adapter 200 changes the power voltage VBUS from 5V to 9V or 12V and increases the charging current Ichg. Next, the processor 140 provides the control signal Ctrl to notify the battery charging circuit 120 that the power voltage VBUS is increased. Thus, the battery charging circuit 120 will receive the charging current Ichg higher than 1.5 A, wherein the charging current Ichg is determined according to the capability of the battery charging circuit 120. Therefore, the battery charging circuit 120 can receive a higher current and charge the battery 130 according to the higher current, thereby decreasing the charging time for the portable electronic device 100.

Figure 3:
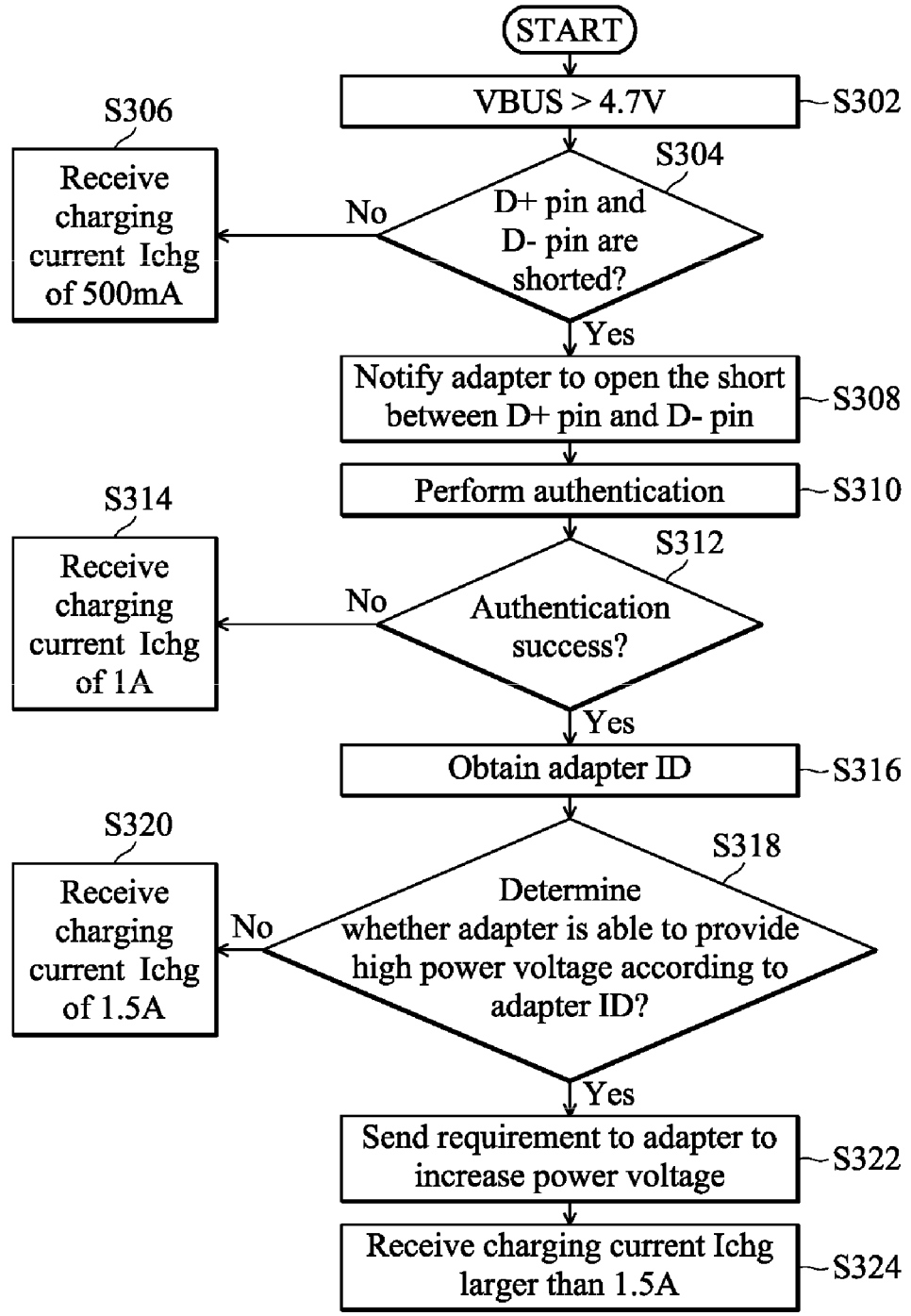
FIG. 3 shows a charging method for a portable electronic device according to an embodiment of the invention.

FIG. 3 shows a charging method for a portable electronic device 100 according to an embodiment of the invention. Referring to FIG. 2 and FIG. 3 together, in step S302, when an external device (e.g. the adapter 200, an adapter with an output of 5V or a computer) is electrically connected to the portable electronic device 100, the processor 140 detects that the power voltage VBUS at the power pin 116 of the connector 110 is higher than a predetermined voltage, e.g. 4.7V according to the signal Inf provided by the battery charging circuit 120. Next, in step S304, the processor 140 detects whether the data pins 112 and 114 are shorted by the external device. If it is detected that the data pins 112 and 114 of the connector 110 are not shorted, the processor 140 determines that the external device is not an adapter (i.e. the external device is a computer), and then the processor 140 provides the control signal Ctrl to the battery charging circuit 120, so as to receive the charging current Ichg of 500 mA (step S306). Conversely, if the data pins 112 and 114 of the connector 110 are shorted, the processor 140 determines that the external device is an adapter. Next, in step S308, the processor 140 notifies the adapter to open the short between the data pins 112 and 114 of the connector 110, e.g. by opening the short between the data pins 212 and 214. For example, the processor 140 may toggle the data pins 112 and 114 of the connector 110, so as to notify the adapter. After the short between the data pins 112 and 114 of the connector 110 is opened by the adapter, the processor 140 performs an authentication operation with the adapter via the data pins 112 and 114 of the connector 110 (step S310). Next, in step S312, the processor 140 determines whether the authentication operation is completed successfully. If the authentication operation is unsuccessful, the processor 140 determines that the external device is a standard adapter, and then provides the control signal Ctrl to the battery charging circuit 120, so as to receive the charging current Ichg of 1 A (step S314). On the contrary, if the authentication operation is successful, the processor 140 obtains an identification code (ID code) from the adapter (step S316). Next, in step S318, the processor 140 identifies the identification code according to a plurality of specific codes stored in the memory 150 and determines whether the adapter is able to provide a high power voltage VBUS (>5V) according to the identified code. If the identification code does not match any of the specific codes, the processor 140 determines that the adapter is unable to provide a high power voltage VBUS, and then provides the control signal Ctrl to the battery charging circuit 120, so as to receive the charging current Ichg of 1.5 A (step S320). On the contrary, if the identification code matches one of the specific codes, the processor 140 sends a requirement to the adapter via the data pins 112 and 114 of the connector 110, so as to require an increase of the power voltage VBUS (step S322). When the adapter receives the requirement from the processor 140, it changes the power voltage VBUS from 5V to 9V or 12V according to the requirement so as to output a charging current Ichg higher than 1.5 A. Afterwards, the processor 140 provides the control signal Ctrl to the battery charging circuit 120, so as to receive the charging current Ichg higher than 1.5 A and a higher power voltage VBUS, e.g. 5V or 9V (step S324). Thus, the battery 130 can be charged quickly according to the charging current Ichg higher than 1.5 A.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device, comprising:
   a memory configured to store at least one specific code;
   a connector, having a first data pin, a second data pin and a power pin;
   a battery;
   a battery charging circuit electrically coupled between the connector and the battery, and configured to receive a charging current and a power voltage from an external device via the power pin and to charge the battery according to the charging current; and
   a processor configured to detect whether the first and second data pins are shorted by the external device when the power voltage is higher than a specific voltage, wherein when the processor detects that the first and second data pins are shorted, the processor sends a request to the external device for making the first and second data pins open and obtains an identification code from the external device via the first and second data pins after the first and second data pins are opened in response to the request,
   wherein if the identification code matches the specific code stored in the memory, the processor sends a requirement to the external device; and
   wherein the power voltage and the charging current received by the battery charging circuit are increased by the external device in response to the requirement.

2. The portable electronic device as claimed in claim 1, wherein the increased power voltage is larger than 5 Volts, and the specific voltage is smaller than 5 Volts.

3. The portable electronic device as claimed in claim 1, wherein when the processor detects that the first and second data pins of the connector are shorted, the processor determines that the external device is an adapter and sends the request to the adapter by toggling the first and second data pins of the connector.

4. The portable electronic device as claimed in claim 3, wherein the first and second data pins of the connector are shorted by a switch of the adapter, and after the first and second data pins of the connector are toggled by the processor, the adapter turns off the switch such that the first and second data pins are opened.

5. The portable electronic device as claimed in claim 1, wherein when the processor detects that the first and second data pins of the connector are not shorted by the external device, the processor determines that the external device is not an adapter, and the charging current received by the battery charging circuit is 500 mA.

6. The portable electronic device as claimed in claim 1, wherein when the processor detects that the first and second data pins of the connector are shorted, the processor determines that the external device is an adapter, and after the first and second data pins are opened in response to the request and before the processor obtains the identification code, the processor performs an authentication operation with the adapter via the first and second data pins of the connector.

7. The portable electronic device as claimed in claim 6, wherein when the authentication operation is unsuccessful, the charging current received by the battery charging circuit is larger than 500 mA.

8. The portable electronic device as claimed in claim 7, wherein when the authentication operation is successful, the processor obtains the identification code from the adapter via the first and second data pins of the connector.

9. The portable electronic device as claimed in claim 7, wherein if the identification code does not match the specific code stored in the memory, the charging current received by the battery charging circuit is larger than 1 A.

10. The portable electronic device as claimed in claim 1, wherein the increased charging current received by the battery charging circuit is larger than 1.5 A.

11. The portable electronic device as claimed in claim 1, wherein the first and the second data pins of the connector are compatible with a USB_D+ pin and a USB_D− pin of USB standard, and the power pin is compatible with a VBUS pin of USB standard.

12. A charging method for a portable electronic device, wherein the portable electronic device comprises a battery, a memory and a connector having a first data pin, a second data pin and a power pin, the method comprising:
    receiving a charging current and a power voltage from an external device via the power pin and charging the battery according to the charging current;
    detecting whether the first data pin and the second data pin are shorted by the external device when the power voltage is higher than a specific voltage;
    sending a request to the external device for making the first and second data pins open and obtaining an identification code from the external device via the first and second data pins after the first and second data pins are opened in response to the request;
    sending a requirement to the external device if the identification code matches a specific code stored in the memory, wherein the power voltage and the charging current are increased by the external device in response to the requirement; and receiving the increased charging current and charging the battery according to the increased charging current.

13. The charging method as claimed in claim 12, wherein the step of detecting whether the first and second data pins are shorted by the external device further comprises:

determining that the external device is an adapter when the first and second data pins of the connector are shorted by the external device; and the request to the adapter by toggling the first and second data pins of the connector when the external device is the adapter.

14. The charging method as claimed in claim 13, wherein the first and second data pins of the connector are shorted by a switch of the adapter, and after the first and second data pins of the connector are toggled, the adapter turns off the switch such that the first and second data pins are opened.

15. The charging method as claimed in claim 12, wherein the step of detecting whether the first and second data pins are shorted by the external device further comprises:

determining that the external device is not an adapter when the first and second data pins of the connector are not shorted by the external device; and receiving 500 mA of the charging current when the external device is not the adapter.

16. The charging method as claimed in claim 12, wherein the external device is an adapter and wherein after the first and second data pins are opened in response to the request and before the step of obtaining the identification code, the method further comprises:

performing an authentication operation with the adapter via the first and second data pins of the connector.

17. The charging method as claimed in claim 16, further comprising:

receiving the charging current, which is larger than 500 mA when the authentication operation is unsuccessful.

18. The charging method as claimed in claim 17, further comprising:

obtaining the identification code from the adapter via the first and second data pins of the connector when the authentication operation is successful.

19. The charging method as claimed in claim 17, further comprising:

receiving the charging current, which is larger than 1 A, if the identification code does not match the specific code stored in the memory.

20. The charging method as claimed in claim 12, wherein the first and the second data pins of the connector are compatible with a USB_D+ pin and a USB_D− pin of USB standard, and the power pin is compatible with a VBUS pin of USB standard.

* * * * *